US006161186A

United States Patent [19]

Smith

[11] Patent Number: 6,161,186

[45] Date of Patent: Dec. 12, 2000

[54] LOWER POWER PASSIVE LISTEN METHOD FOR ELECTRONIC DEVICES

[75] Inventor: Kevin N Smith, Fort Collins, Colo.

[73] Assignee: Hewlett Packard Company, Palo Alto, Calif.

[21] Appl. No.: 09/249,644

[22] Filed: Feb. 12, 1999

[51] Int. Cl.[7] .............................. G06F 1/32; G06F 17/00

[52] U.S. Cl. ........................................... 713/320; 712/203

[58] Field of Search .................................... 713/320, 321, 713/324, 600; 709/100, 253; 710/51, 129, 100; 348/10; 370/278, 916; 455/73, 91; 340/825.22, 286.03; 375/135; 712/1, 17, 203

[56] References Cited

U.S. PATENT DOCUMENTS

| | | |
|---|---|---|
| 4,677,433 | 6/1987 | Catlin et al. . |
| 5,202,988 | 4/1993 | Spix et al. . |
| 5,453,792 | 9/1995 | Gifford et al. . |
| 5,754,094 | 5/1998 | Frushour . |

*Primary Examiner*—Gopal C. Ray

[57] ABSTRACT

An apparatus for receiving and processing digital signals. Techniques and apparatus are disclosed for reducing power consumption in digital receiving and processing circuits without manual intervention and without data rate reduction. The digital signal comprises a leading, slower data rate signal and a trailing, faster data rate signal. When the pre-defined leading signal is received, a slower digital-signal processor processes that signal and then activates a faster digital-signal processor which processes the trailing, faster signal. After processing the trailing signal, the faster digital-signal processor is deactivated.

8 Claims, 2 Drawing Sheets

LOWER POWER PASSIVE LISTEN METHOD FOR ELECTRONIC DEVICES

FIELD OF THE INVENTION

The present invention relates generally to data communication devices and more particularly to data communication devices containing processor circuitry that operates at high speeds.

BACKGROUND OF THE INVENTION

Data communication hardware often contains circuitry that processes data at high speeds. As an example, typical speeds for logic circuits in fast Infrared (FIR) hardware is 48 MHz. The faster a device operates, generally the more power the device consumes. Power is consumed whenever the data communication device is turned on and it is receiving data, transmitting data, processing data, or only listening for the occurrence of a data signal. It is necessary for the device to operate at high speed when it is in receive, transmit, or process mode. However, when in listen mode, a great deal of power can be lost waiting for a signal that may never occur.

Previous solutions to the problem of power consumption during listen mode have been to either run at lower speeds as is found in Serial Infrared (SIR) devices or to require the operator to manually place the device in listen mode before data is received. Both of these solutions extract a penalty and are counter productive. Operating at lower speeds results slower data processing which may be unacceptable. Requiring operator intervention adds to the operator's workload and may result in lost data if the operator fails to place the device in listen mode at the appropriate time. Also, power will be consumed unnecessarily, if the operator fails to take the device out of listen mode at the appropriate time.

Thus, there is a need for systems in which communication devices operate in a low power listen mode that automatically switches to high speeds during receive, process, and transmit modes, and which automatically switch back to the low power listen mode when not receiving, processing, or transmitting.

SUMMARY OF THE INVENTION

The present patent document discloses methods and apparatus for processing digital-electronic signals while conserving power. In general, the faster a digital electronic circuit operates, the more power it consumes. Previous methods for conserving power while processing digital-electronic signals have relied upon either operating at slower speeds or manual intervention in turning the circuit on only during times of anticipated signal reception. In preferred embodiments, the present invention provides techniques for automatically reducing power consumption in such circuits without manual intervention and without data rate reduction.

In a preferred embodiment, a digital-electronic receiving circuit comprises an electronic signal receiver which could be also be a transceiver. The digital-electronic receiving circuit receives a digital-electronic-data signal and conveys the signal to a first digital-signal processor and to a second digital-signal processor. The digital-electronic-data signal comprises a slower data rate leading signal part and a faster data rate trailing signal part. Typical data rates for the leading signal part are approximately 9,600 bits per second to 115,200 bits per second, and typical data rates for the trailing signal part are approximately 9,600 bits per second to four megabits per second. It should be noted that these are typical data rates, and that the invention is not limited to the ranges stated. It is only necessary for the leading signal data rate to be slower than the trailing signal data rate.

In listen mode, wherein the digital-electronic receiving circuit is waiting for an incoming digital-electronic-data signal, typically power is conserved by inactivating the second digital-signal processor which operates at the faster data rate. Upon reception of the digital-electronic-data signal, the first digital-signal processor, which operates at the slower data rate, processes the leading signal part of the digital-electronic-data signal and activates the faster, second digital-signal processor. The leading signal part is a signal comprising typically a pre-specified protocol. The faster, second digital-signal processor which has been activated then processes the trailing signal part. Following completion of the digital-electronic-data signal, the faster, second digital-signal processor is automatically deactivated in a representative embodiment, and the digital-electronic receiving circuit returns to listen mode.

In representative embodiments, power is conserved while maintaining data rate by deactivating the faster data rate digital-signal processor during those times the digital-electronic receiving circuit is in listen mode. Automatic activation is obtained when the slower data rate digital-signal processor detects the pre-specified protocol signal in the leading signal part of the digital-electronic-data signal. When the appropriate protocol signal is detected, the slower data rate digital-signal processor provides a signal to activate the faster data rate digital-signal processor.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings provide visual representations which will be used to more fully describe the invention and can be used by those skilled in the art to better understand it and its inherent advantages. In these drawings, like reference numerals identify corresponding elements and.

DETAILED DESCRIPTION OF THE PREFERRED EMBODIMENTS

1. Introduction

Figure 1:
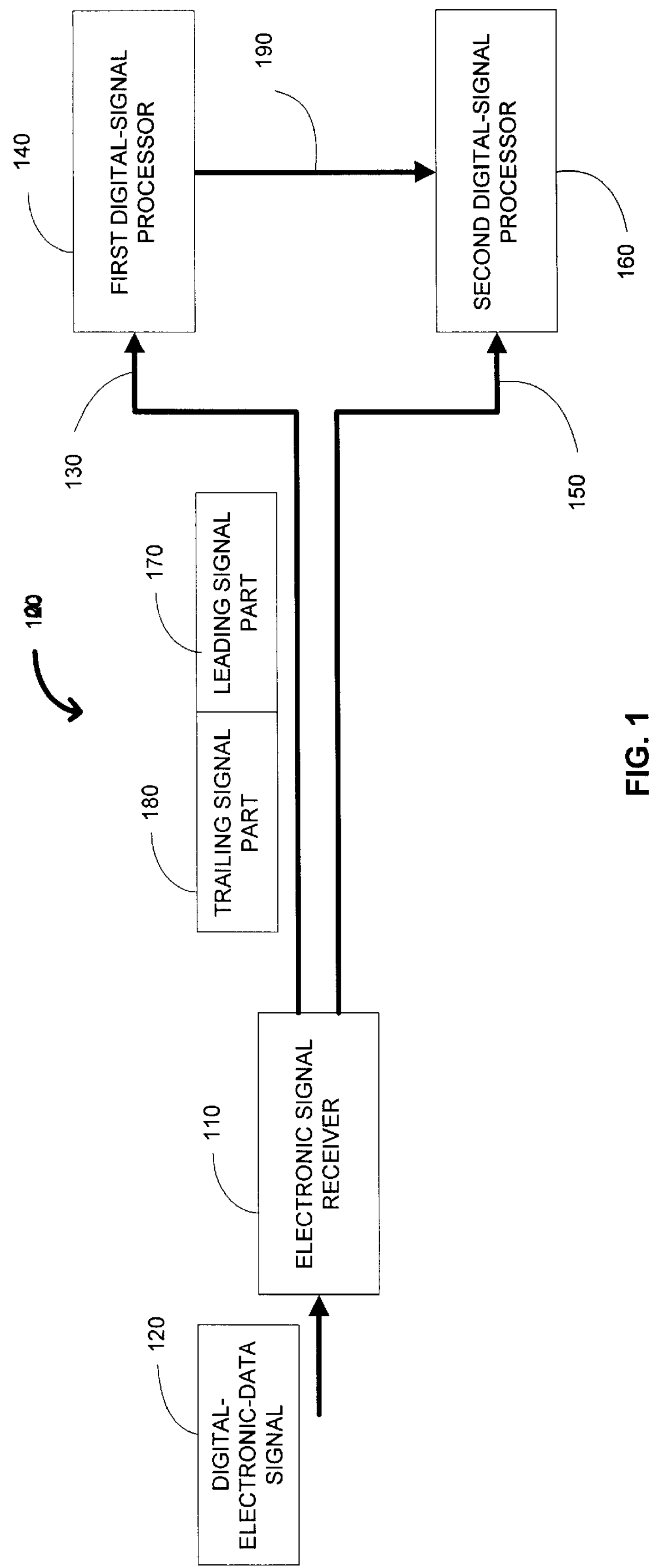
FIG. 1 is a drawing of a digital-electronic receiving circuit as described in a representative embodiment.

As shown in the drawings for purposes of illustration, the present patent document discloses methods and apparatus for processing digital-electronic signals. In general, the faster a digital electronic circuit operates, the more power it consumes. Previous methods have relied upon either operating at slower speeds or manual intervention by turning the circuit on only during times of anticipated signal reception. In preferred embodiments, the present invention provides techniques for automatically reducing power consumption in such circuits without manual intervention and without data rate reduction. In the following detailed description and in the several figures of the drawings, like elements are identified with like reference numerals.

2. Representative Digital-Electronic Receiving Circuit

FIG. 1 is a drawing of a digital-electronic receiving circuit 100 as described in a representative embodiment. The digital-electronic receiving circuit 100 comprises an electronic signal receiver 110 which could be also be a transceiver. The digital-electronic receiving circuit 100 receives a digital-electronic-data signal 120 and conveys the digital-electronic-data signal 120 via a first signal path 130 to a first digital-signal processor 140 and via a second signal path 150 to a second digital-signal processor 160. The digital-electronic-data signal 120 comprises a leading signal part 170 and a trailing signal part 180. The data rate of the leading signal part 170 is slower than the data rate of the trailing signal part 180. The data rate of the leading signal part 170 is referred to herein as the leading signal data rate, and the data rate of the trailing signal part 180 is referred to herein as the trailing signal data rate. Typical data rates for the leading signal 170 data rate are approximately from 9,600 bits per second to 115,200 bits per second, and typical data rates for the trailing signal 180 data rate are approximately from 9,600 bits per second to four megabits per second. It should be noted that these are typical data rates, and that the invention is not limited to the ranges stated. It is only necessary for the leading signal 170 data rate to be slower than the trailing signal 180 data rate.

The first digital-signal processor 140 is also referred to herein as the slower digital-signal processor 140; the second digital-signal processor 160 as the faster digital-signal processor 160; the leading signal part 170 as the leading signal 170 and as the slower signal part 170; the trailing signal part 180 as the trailing signal 180 and the faster signal part 180; the leading data rate as the slower data rate; and the trailing data rate as the faster data rate.

In listen mode wherein the digital-electronic receiving circuit 100 is waiting for an incoming digital-electronic-data signal 120, typically power is conserved by inactivating the second digital-signal processor 160. Upon reception of the digital10 electronic-data signal 120, the first digital-signal processor 140 processes the leading signal part 170 of the digital-electronic-data signal 120 and activates the second digital-signal processor 160 via control path 190. The leading signal part 170 is a signal typically comprising a pre-specified protocol. The second digital-signal processor 160 which has been activated then processes the trailing signal part 180. Following completion of the digital-electronic-data signal 120, the second digital-signal processor 160 is automatically deactivated in a representative embodiment and the digital-electronic receiving circuit 100 returns to listen mode.

In representative embodiments, power is conserved while maintaining data rate by deactivating the faster data rate second digital-signal processor 160 during those times the digital-electronic receiving circuit 100 is in listen mode. Automatic activation is obtained when the first digital-signal processor 140 detects the pre-specified protocol signal in the leading signal part 170 of the digital-electronic-data signal 120. When the appropriate protocol signal is detected, the first digital-signal processor 140 provides a signal to activate the faster data rate second digital-signal processor 160.

3. Operational Flow Chart of Digital-Electronic Receiving Circuit

Figure 2:
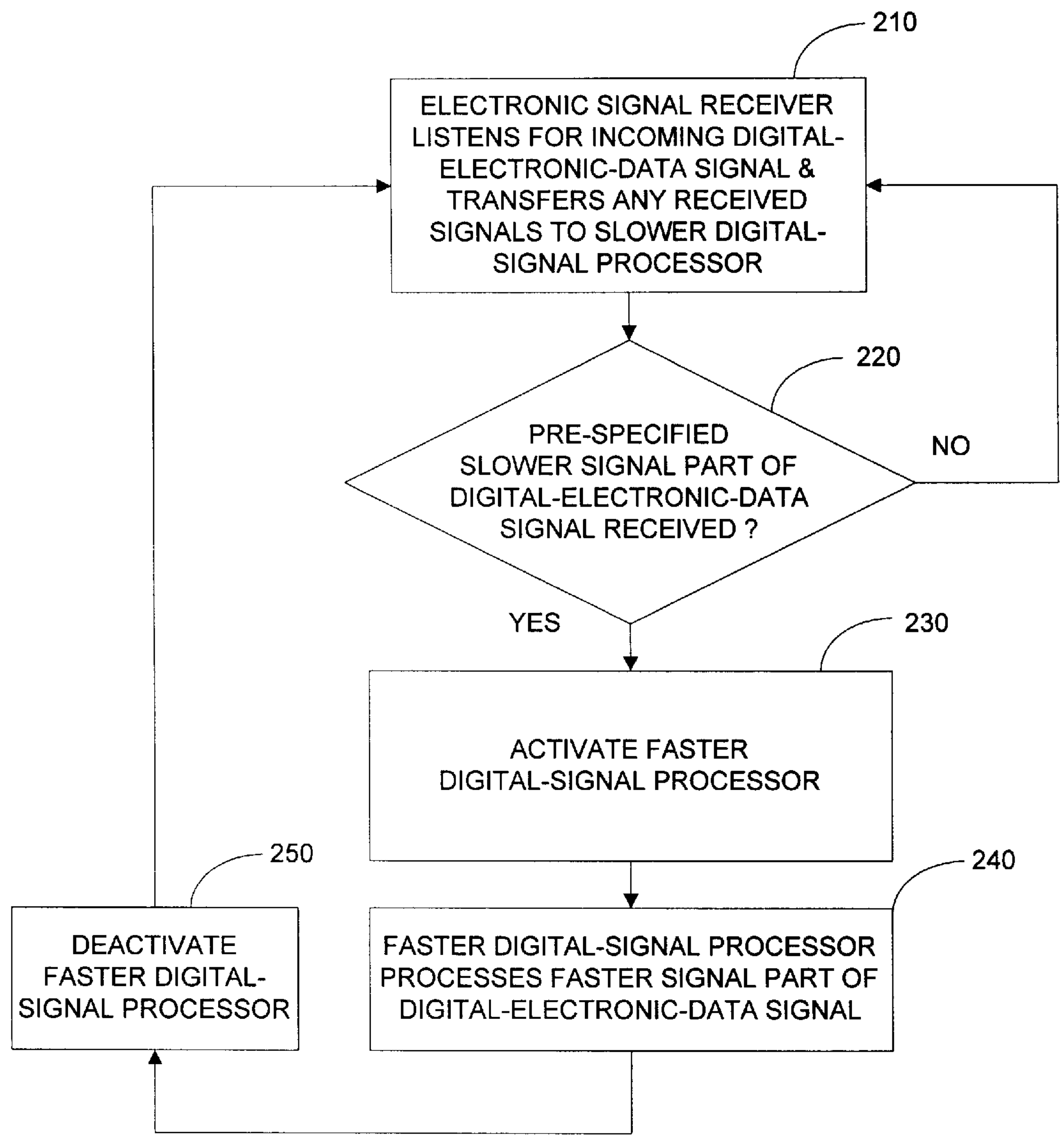
FIG. 2 is a flow chart of the operation of the digital-electronic receiving circuit in a representative embodiment.

FIG. 2 is a flow chart of the operation of the digital-electronic receiving circuit 100 in a representative embodiment. In block 210 of FIG. 2, the digital-electronic receiving circuit 100 is in listen mode. Block 210 transfers any electronic signals received by the electronic signal receiver 110 to the slower digital-signal processor 140. Block 210 then transfers control to block 220.

When the pre-specified protocol slower signal part 170 is received, block 220 transfers control to block 230. Otherwise, block 220 transfers control to block 210.

Block 230 activates the faster digital-signal processor 160. Block 230 transfers control to block 240.

In block 240 the faster digital-signal processor 160 processes the faster signal part 180 of the digital-electronic-data signal 120. Block 240 then transfers control to block 250.

Block 250 deactivates the faster digital-signal processor 160. Block 250 then transfers control back to block 210 thereby returning the digital-electronic receiving circuit 100 to listen mode.

4. Concluding Remarks

The methods and apparatus describing representative embodiments in the present patent document provide techniques for receiving and processing digital-electronic-data signals by digital electronic receiving circuits which provide the advantages of reducing power consumption in those circuits without manual intervention and without data rate reduction.

While the present invention has been described in detail in relation to preferred and representative embodiments thereof, the described embodiments have been presented by way of example and not by way of limitation. It will be understood by those skilled in the art that various changes may be made in the form and details of the described embodiments resulting in equivalent embodiments that remain within the scope of the appended claims.

What is claimed is:

1. A method for processing a digital-electronic-data signal, which comprises the steps of:

listening for the digital-electronic-data signal by an electronic signal receiver, wherein the digital-electronic-data signal comprises a leading signal and a trailing signal and wherein the leading signal data rate is slower than the trailing signal data rate;

transferring the leading signal from the electronic signal receiver to a first digital-signal processor;

when the leading signal part is received by the first digital-signal processor, processing the leading signal by the first digital-signal processor at the leading signal data rate; and when the leading signal part is processed by the first digital-signal processor, activating a second digital-signal processor;

transferring the trailing signal from the electronic signal receiver to the second digital-signal processor; and processing the trailing signal part by the second digital-signal processor at the trailing signal data rate.

2. The method as defined by claim 1, which further comprises the steps of:

when the trailing signal has been processed by the second digital-signal processor, deactivating the second digital-signal processor.

3. The method as defined by claim 1, wherein the first digital-signal processor is a universal asynchronous receiver transmitter and the second digital-signal processor is a fast infrared block.

4. The method as defined by claim 1, wherein the leading signal data rate lies substantially in the range of 4,800 bits per second to 230,400 bits per second and the trailing signal data rate lies substantially in the range of 4,800 bits per second to 8 megabits per second.

5. An apparatus for processing a digital-electronic-data signal, which comprises:

an electronic signal receiver for receiving the digital-electronic-data signal, wherein the digital-electronic-data signal comprises a leading signal and a trailing signal and wherein the leading signal data rate is slower than the trailing signal data rate;

a first digital-signal processor for processing the leading signal, wherein the electronic signal receiver transfers the leading signal to the first digital-signal processor; and a second digital-signal processor for processing the trailing signal, wherein the first digital-signal processor activates the second digital-signal processor after processing the leading signal and wherein the electronic signal receiver transfers the trailing signal to the second digital-signal processor.

6. The apparatus as recited in claim 5, wherein the second digital-signal processor is further configured to deactivate the second digital-signal processor after the trailing signal has been processed.

7. The apparatus as recited in claim 5, wherein the first digital-signal processor is a universal asynchronous receiver transmitter and the second digital-signal processor is a fast infrared block.

8. The apparatus as recited in claim 5, wherein the leading signal data rate lies substantially in the range of 4,800 bits per second to 230,400 bits per second and the trailing signal data rate lies substantially in the range of 4,800 bits per second to 8 megabits per second.

* * * * *